United States Patent Office 3,701,711
Patented Oct. 31, 1972

3,701,711
DECORATIVE ALUMINUM CLAD LAMINATE
Peter Bernard Kelly, Cincinnati, Ohio, assignor to
Formica Corporation, Cincinnati, Ohio
No Drawing. Filed May 20, 1971, Ser. No. 145,568
Int. Cl. B32b 15/08, 15/12, 15/30
U.S. Cl. 161—214
9 Claims

ABSTRACT OF THE DISCLOSURE

A decorative aluminum clad laminate comprising a heat and pressure consolidated assembly of (1) a rigidity imparting base member, (2) an alpha cellulose paper decorative layer wherein the alpha cellulose layer contains from about 30% to 70% by weight of a thermosetting melamine formaldehyde resin, having a mole ratio between about 1:1.5 to 1:2.5 melamine to formaldehyde respectively, (3) positioned on the decorative layer is an adhesive copolymer film of ethylene and acrylic acid and (4) an aluminum foil positioned on the copolymer film.

BACKGROUND OF THE INVENTION

For many years decorative high pressure laminates have been used as a surfacing material for walls, partitions, table tops, counter tops, furniture, doors and other similar applications. These decorative laminates have been produced by a plurality of prior art processes. In making such laminates it is conventional to utilize a plurality of resin impregnated core sheets generally composed of kraft paper which have been impregnated with a thermosetting resin and more particularly as a general rule with a thermosetting phenolic resin, the sheets are dried and cut to appropriate size. Thereupon, a plurality of these resin impregnated sheets are stacked in a superimposed relationship. The number of plies in the stack will depend upon the ultimate intended use of the laminate. For most purposes the number of these core sheets will total 6 to 9. For decorative laminates there is then placed on the stack of core sheeets a decorative sheet which is generally a sheet of alpha cellulose paper bearing a printed design or a light color and impregnated with a noble thermosetting resin which is not subject to any significant darkening upon the application of heat. Resins for the decorative sheets are the aminotriazine resins and more particularly the unsaturated polyester resins, the epoxy resins and the like.

It is generally desirable when making decorative laminates to make use of a protective overlay sheet which is similar to the decorative sheet but generally devoid of design and in the final laminate is transparent. The laminates produced are heat and pressure consolidated to a unitary structure in which the press plate is a polished stainless steel plate. Such an approach produces a very smooth surface laminate with a glossy finish. Other techniques are used to produce laminates with a smooth surface but with a satin or brush textured effect. More recent techniques permit the manufacture of laminates with a three dimensional design on the surface, like slate.

These decorative laminates have found broad and extensive use for surfacing objects such as walls, partitions, doors, table tops, vanities, desks, cabinets and the like by bonding or veneering the laminate with an adhesive to a suitable rigid substrate such as plywood, particleboard, hardboard, gypsum board, cement asbestos board and many others. The fabrication and installation of the veneered assembly is readily accomplished with tools common to the woodworking industry such as saws, drills, shapers, routers, etc.

More recently, the dictates of fashion by architects and designers specify that laminates have a metallic luster for vertical applications in commercial institutions, in applications such as bank fixtures, elevator cab interiors, display cases in department stores, lobby walls, corridor walls and more particularly accent feature panels on walls.

One way to meet this growing demand would be to use sheets of metal, say of about 1/16" thickness in either aluminum, copper, steel and even alloys such as brass. All of these metals require a special preparation of the surface before being bonded to a rigid substrate. Furthermore, these metal sheets would be heavy to handle, since they are about twice the weight per square foot of a conventional plastic laminate; they are cumbersome and awkward to handle; not alone mentioning their higher cost. Besides these disadvantages, metal sheets require special metal working tools for fabrication and installation of systems of this type. Many efforts have been made to surface one side of a conventional high pressure decorative laminate with a metal foil, in order to make use of its highly visible, eye-catching features, especially when combined with the lighter weight per square foot of a laminate, its greater ease of fabrication and installation with woodworking tools. Another desirable feature of an aluminum foil clad laminate is enhanced texturing and embossing design latitude now possible in using recently developed techniques in the laminating industry. Manufacture of metal sheets have limitations because of expensive dies, molds and the like.

Laminates of a consolidated phenolic impregnated kraft core, surfaced on one side with lightweight metal such as aluminum have been prepared in the past. However, most such laminates have been deficient in their bonding between the core and the aluminum.

THE FIELD OF THE INVENTION

The present application is in the field of high pressure consolidated decorative laminates surfaced with an aluminum foil wherein the aluminum is tenaciously bonded to the surface of the laminate structure.

DESCRIPTION OF THE PRIOR ART

The prior art, as is known to the present inventor is shown in U.S. Pat. No. 3,011,383.

SUMMARY OF THE INVENTION

This invention is directed to a decorative aluminum clad laminate comprising an assembly of a rigidity imparting base member, an alpha cellulose paper layer impregnated with from about 40 to about 60% by weight of a thermosetting melamine formaldehyde resin, a film of a copolymer of ethylene and acrylic acid, and a layer of aluminum foil. The entire assembly is heat and pressure consolidated to a unitary structure by conventional means wherein the aluminum is tenaciously bonded to the laminated structure.

DETAILED DESCRIPTION

The aluminum foils are available commercially from a number of sources in a wide choice of thicknesses, widths, alloys, tempers, finishes, surface treatments and in some cases with various types of protective coatings and films adhered thereto.

Foils are available from about 0.0002" up to about 0.0055". Heavier gauges of rolled aluminum are termed "sheet" rather than foil. We could use a foil of between about .0005" up to about .005" but prefer to use a thickness of about .001".

Aluminum foils are available in either a so-called purity grade or alloy composition. We prefer a 99.35 minimum purity grade and identified or designated by the Aluminum Association as either No. 1235 or 1145. The aluminum foil is available in several tempers or hardnesses such as dead soft, intermediate, full hard or extra hard. We prefer to use a dead soft temper.

Moreover, variations on available surface finish of foil are also a factor. Finishes are available such as bright, extra bright, mat or dull either on both sides or one side.

Also available are foils having a coating on one side, wherein when the coated side is used as the uppermost surface in a decorative laminate structure, the resulting laminate has significantly enhanced wear resistance, scratch resistance and even weatherability depending upon the choice of coatings used. Coatings are of a wide variety and could be lacquer, paint or other organic material.

The aforementioned coatings may be clear and uncolored or transparent but containing transparent pigments in order to allow a choice of color and design. Instead of using a coating on one side of the foil to enhance surface properties in the ultimate laminate structure, the foil may be laminated with a film for enhancing surface properties. Many plastic films are laminated to foil including polyethylene, polypropylene, cellulose acetate, vinyls, polyvinyl fluoride and polyesters. The choice of one of these films would depend upon the ultimate surface properties desired. The preferred foil has a mat finish on one side and bright finish on the opposite side and bonded to the bright side by a polyurethane type adhesive is a film of a linear thermoplastic polyester such as Mylar®.

Other attractive colored metallic finishes are possible and are achieved by incorporating a transparent pigment or dye into the adhesive which is used to bond the Mylar to the aluminum. Bright yellow brass to coppery reds to antique bronze browns are possible.

In order to assure tenacious bonding of the aluminum foil to a rigidity imparting core, it is essential that the aluminum be clean, for example, free of dirt, grease or other contaminants.

While I prefer to use aluminum foil, the foil may be made of other materials such as zinc, tin, nickel, copper or alloys such as brass and the like.

The adthesive film used for bonding the layer of aluminum foil to the melamine formaldehyde impregnated alpha cellulose layer is a copolymer of ethylene and acrylic acid. The film is commercially available as Grade No. PZ-4333.09 from Dow Chemical Co. in a thickness range from about .001" to about .006". These co-polymers are shown in the U.S. Pat. No. 3,239,370 which patent is incorporated therein by reference.

Directly beneath the adhesive film and bonded thereto is a melamine formaldehyde impregnated decorative layer, used for enhancement of the bond strength of the ultimate consolidated laminated structure. Furthermore, it is possible to select a color which is the same or similar to the metallic foil so that in the event of damage to the surface such as deep scratches or gouging, the damage would be masked by the color of the underlaying decor layer.

The decorative layer is impregnated with conventional amounts of the thermosetting melamine-formaldehyde resins between about 30% and 70% by weight and preferably between about 40% to 60% by weight, said percentage by weight being based on the total weight of the paper and the resin.

The melamine formaldehyde resin used in the above stated amounts to impregnate the decorative layer is in direct physical contact with the adhesive film and must be impregnated with a melamine formaldehyde thermosetting resin having a mol ratio varying about 1:1.5 and 1:2.5 melamine to formaldehyde respectively.

Although the decorative layer is preferably impregnated with a thermosetting melamine formaldehyde resin, other resins may be substituted such as the urea formaldehyde resins, the thiourea formaldehyde resins, triazine resins such as benzoguanamine formaldehyde resin and the like; but the melamine formaldehyde resins are, however, preferred.

The saturable decorative layer may be a solid color paper of a finer quality than the kraft paper used in the subjacent core and is generally composed of alpha cellulose fiber. Pigments and other additives are incorporated at the time the paper is made in order to obtain various colors such as white, the pastels such as grey, yellow, pink and the like. Papers of this type have traditionally been used for years in the laminating industry and are available in a basis weight of from about 40 lbs. up to 130 lbs. for a 3,000 sq. ft. ream size.

Unpigmented light basis weight alpha cellulose papers commonly referred to as overlays may also be used in place of the decor sheets. These papers range from 18 lbs. to 30 lbs. per 3,000 sq. ft. ream size. When an overlay sheet is used it is normally impregnated with conventional amounts of melamine-formaldehyde resin from about 50 to 70% by weight.

Beneath the decorative layer, any of the rigidity imparting base members may be used and preferably one would use one or more kraft paper core sheets impregnated with a thermosetting phenolic resin. The kraft paper which constitutes the base member and/or core sheets should have a basis weight of between about 40 to about 135 lbs. (3,000 sq. ft. ream size) and preferably content of 25% to 35% by weight resin solids. The numbers of core sheets can be varied at will and depend upon the desired thickness of the ultimate laminate. During the heat and pressure consolidation step, all of the thermosetting resins used to impregnate the various layers, namely the melamine-formaldehyde and the phenol-formaldehyde resins are converted to the thermoset state.

In carrying out the various steps of the present invention, it is very frequently desirable to make use of a release sheet or release paper that is positioned between the polished press plate and the aluminum foil surface of the laminate. These release members are used for both the decorative surface and back of the laminates. These different releases will change surface gloss and texture. Among those which may be used in the practice of the present invention are Pat-a-Par, a product of Patterson Parchment Paper Co.; glassine, polypropylene films, paperbacked aluminum foils, wax paper and the like.

More recently techniques have been discovered which permit the manufacture of decorative laminates wherein the surface may be deep textured with three dimensional designs. Many design configurations are possible by the process which encompasses simulated designs such as those occurring in nature, like slate, sandstone, brick, travertine marble, rough or weathered timber and even material like rough woven goods such as jute, hemp and other materials such as leather and the like. Other designs could include low relief designs typical of figures and symbols. The foregoing technique lends itself very well to various designs on metal foil surface laminates wherein a design imparting master laminate is superimposed on an aluminum foil surface laminate assemblage and the entire assemblage heat and pressure consolidated to a unitary structure. Reference is made to U.S. application Ser. No. 60,652, filed on Aug. 3, 1970. Upon removal from the press, the master laminate is removed from the textured decorative laminate. Other design embossing techniques such as are disclosed in U.S. Pat. No. 3,373,068 for intricately embossed patterns may also be used in the process.

In order that the concept of the present invention may be fully understood, the following examples are set forth:

EXAMPLE 1

Eight sheets of a thermosetting phenol-formaldehyde resin impregnated kraft paper are arranged in a superimposed relationship. A grey colored decorative sheet of 90 lb. basis weight alpha cellulose paper impregnated with a thermosetting melamine-formaldehyde resin in a content of about 50% by weight of the melamine-formaldehyde resin is superimposed on the core sheets. On the decorative sheet there is positioned a commercially available .002" film of a copolymer of ethylene and acrylic acid obtained from Dow Chemical Company as Grade PZ–4333.09. On the copolymer adhesive film is positioned a .002" composite layer of a Mylar backed .001" aluminum foil. The aluminum surface with a mat finish contacts the adhesive film, and the entire assembly is inserted into a press and heat and pressure consolidated to a unitary structure using 1400 p.s.i. pressure and heating between 135°–145° C. for 20 minutes and then cooling and removing from the press. The decorative surface of the laminate has an attractive pebble-like or krinkle finish.

Samples of the laminate to be tested are cut into strips one inch wide by four inches long for evaluation of the bond properties between the foil and laminate substrate using an Instron Tensile Tester at a 90° pull.

The aluminum foil on the specimen is peeled back approximately one inch so that the line of peel is perpendicular to the edge of the specimen. The specimen is clamped or held on a horizontal surface which is secured to the lower jaw of the Instron Tensile Tester. The peeled aluminum strip extends upwardly at 90° for one inch, and is secured or gripped between two knurled clamps of the upper jaw of the Instron Tensile Tester which in turn are connected to a force indicator.

The upper jaws cover the full width of the aluminum foil and are parallel to the line of peel. The testing machine is turned on, and a force exerted in a vertical plane. The aluminum foil is pulled from the base material at a speed of 0.5 inch/minute. After one inch of foil has been pulled, readings are taken from the force indicator chart and reported in pounds per inch. Values of 9 to 13 lbs. per inch width were obtained.

Additional tests were made by veneering or bonding the laminate to a ¾" thick particleboard core and conducting machining tests such as sawing, routing, drilling countersink holes and the like, which are normally used in an actual installation procedure. In all phases of the machining operation the laminate performed satisfactorily without any lifting or peeling of the aluminum from the laminate substrate.

Other laminate properties were evaluated such as abrasion, stain, impact, scuff and cigarette resistance, dimensional change and others and were found to comply with industry standards for vertical and/or light duty horizontal high pressure decorative laminate.

EXAMPLE 2

Example 1 is repeated in all essential details except that a .004" adhesive film of the copolymer of ethylene and acrylic acid is used in lieu of .002". From the laminate thus produced, peel strength values of 15 lbs./inch width were obtained.

EXAMPLE 3

Example 1 is repeated in all essential details except that a .006" adhesive film of the copolymer of ethylene and acrylic acid was used. From the laminate produced, the bond between the foil and substrate was so tenacious that the foil could not be peeled back from the base material for testing.

COMPARATIVE EXAMPLE 4

Example 1 is repeated in all essential details except that the melamine formaldehyde resin impregnated paper layer is omitted. After removal from the press, the laminate was inspected. Numerous small blisters were discernible over most of the decorative surface area of the laminate. Samples were cut from an area relatively free of the blisters and were tested in the Instron Tensile Tester. Values were obtained of 3 to 4 lbs. per inch width for peel strength. This laminate is unsatisfactory for commercial use.

The laminate was bonded to a ¾" thick particleboard substrate and subjected to the same machining test as in Example 1. It was readily observed, particularly on sharp outside corners, that the foil was slightly lifted from the rest of the laminate substrate and could even be peeled back damaging the panel so that it was no longer useful.

COMPARATIVE EXAMPLE 5

Example 4 is repeated in all details except that a .004" adhesive film of a copolymer of ethylene and acrylic acid is used in place of the .002". When the resulting laminate was tested for peel strength, it was found that the peel strength had increased only from 4 to 6 lbs./inch width.

EXAMPLE 6

Example 1 is repeated in all essential details except that the eight sheets of phenol formaldehyde resin impregnated kraft paper is replaced with a ¾" thick particleboard. The aluminum was securely bonded indirectly to the board and peel strength values were comparable to Example 1.

EXAMPLE 7

Example 1 is repeated in all essential details except that in lieu of the decorative alpha cellulose melamine formaldehyde resin impregnated layer a 110 lb. basis weight kraft paper impregnated with 50% melamine-formaldehyde resin is used. When samples of the laminate were tested for peel strength the values were comparable to those obtained in Example 1.

EXAMPLE 8

Example 1 is repeated in all essential details except the decorative alpha cellulose sheet is impregnated with 40% by weight of a melamine-formaldehyde resin. The peel strength of the laminate is comparable to Example 1.

COMPARATIVE EXAMPLE 9

Example 1 is repeated in all essential details except the decorative alpha cellulose sheet is impregnated with 25% by weight of a melamine-formaldehyde resin. The peel strength of the laminate was marginal at 7 lbs./inch width.

EXAMPLE 10

Example 1 is repeated in all essential details except the basis weight of the decorative alpha cellulose sheet is 123 lbs. and impregnated with 45% by weight of a melamine formaldehyde resin. The peel strength of the laminate was 13 lbs./inch width.

EXAMPLE 11

Example 1 is repeated in all essential details except that a 30 lb. basis weight alpha cellulose overlay is used in place of the 90 lb. decorative sheet. The overlay is impregnated with 67% by weight melamine-formaldehyde resin. The peel strength test value was 8 lbs./inch width.

EXAMPLE 12

Example 11 is repeated in all essential details except the resin content of the melamine-formaldehyde resin was reduced to 55%. The peel strength value was 10 lb./inch width.

EXAMPLE 13

Example 12 is repeated in all essential details except the resin content of the overlay was reduced to 35% by weight of melamine-formaldehyde resin. The laminate had a mottled surface and was discarded.

EXAMPLE 14

Example 1 is repeated in all essential details except that there is interposed between the aluminum surface and the press plate a 1/16" phenolic impregnated deep texture slate simulated design imparting caul plate. A .002" film of polypropylene is used to separate the aluminum from the design caul. Upon removal from the press, the design caul plate and the polypropylene film are separated from the laminate which now has the attractive pleasing slate design configuration present in the caul plate. Peel strength of the aluminum to the subjacent core is comparable to Example 1 test.

EXAMPLE 15

Example 1 is repeated in all essential details except that the polyurethane adhesive which bonds the Mylar to the aluminum contained a bright yellow brass transparent pigment. The resulting laminate has a pleasing attractive gold like appearance.

EXAMPLE 16

Example 1 is repeated in all essential details except that the side of the Mylar film adjacent to the adhesive has been printed with a suitably pleasing pattern or design.

EXAMPLE 17

Example 1 is repeated in all essential details except that the bright side of the aluminum foil has been suitably printed with an aesthetically pleasing pattern or design.

EXAMPLE 18

Example 14 is repeated in all essential details except in lieu of using the Mylar surface aluminum, a .001" aluminum foil is used with the bright side as the outside surface of the laminate. The peel strength values are comparable to Example 1.

EXAMPLE 19

From the laminate produced according to Example 18, the aluminum surface is treated with a black lacquer and the surface wiped at random to obtain an antique appearance.

I claim:

1. A decorative aluminum clad laminate comprising a heat and pressure consolidated assembly of:
   (1) a rigidity imparting substrate of a plurality of kraft paper sheets wherein said kraft paper sheets had been preimpregnated with a thermosetting phenolic resin,
   (2) an alpha cellulose paper decorative sheet wherein said alpha cellulose sheet had been impregnated with from about 30% to 70% by weight of a thermosetting melamine-formaldehyde resin, having a mol ratio between about 1:1.5 to 1:2.5 melamine to formaldehyde respectively,
   (3) an adhesive film of a copolymer of ethylene and acrylic acid,
   (4) a layer of an aluminum foil, and
   (5) all of said thermosetting resins having been converted to the thermoset state during the heat and pressure consolidation step.

2. A decorative laminate according to claim 1 in which the aluminum is a dead soft temper.

3. A decorative laminate according to claim 2 in which the aluminum foil is between .0005 and .005 inch in thickness.

4. A decorative laminate according to claim 1 having bonded to its decorative aluminum surface a film of a linear thermoplastic polyester.

5. A decorative laminate according to claim 4 in which the adhesive bonding the said polyester film to the aluminum contains a colored transparent pigment.

6. A decorative laminate according to claim 1 in which said copolymer film of ethylene and acrylic acid is between .0005 inch and .008 inch in thickness.

7. A decorative laminate according to claim 1 in which said aluminum foil is .007 inch in thickness.

8. A decorative laminate according to claim 1 in which the aluminum surface is textured.

9. A decorative laminate according to claim 1 in which the decorative paper layer is covered with an alpha cellulose overlay and containing from about 50 to 70% by weight of a melamine-formaldehyde resin.

References Cited

UNITED STATES PATENTS

| | | | |
|---|---|---|---|
| 1,997,359 | 4/1935 | Cochrane | 156—313 X |
| 2,606,855 | 8/1952 | Jenkins | 156—219 |
| 3,445,327 | 5/1969 | Fuerst | 156—323 X |

WILLIAM A. POWELL, Primary Examiner

U.S. Cl. X.R.

156—220, 289, 323; 161—215, 220, 258, 263, 413